United States Patent

Hoelzel et al.

[11] Patent Number: 6,059,356
[45] Date of Patent: May 9, 2000

[54] TWO PART ROOF ARRANGEMENT

[75] Inventors: Guenter Hoelzel, Hochdorf; Bruno Hoffmann, Gaggenau, both of Germany

[73] Assignee: DaimlerChrysler AG, Stuttgart, Germany

[21] Appl. No.: 09/148,998

[22] Filed: Sep. 8, 1998

[30] Foreign Application Priority Data

Sep. 5, 1997 [DE] Germany .................. 197 38 829

[51] Int. Cl.[7] ........................................ B60J 7/11
[52] U.S. Cl. .................. 296/218; 296/224; 296/216.09; 296/103; 296/216.01
[58] Field of Search ............... 296/216.01, 218, 296/224, 216.09, 103

[56] References Cited

U.S. PATENT DOCUMENTS

| | | | |
|---|---|---|---|
| 3,075,807 | 1/1963 | Werner | 296/224 |
| 3,079,196 | 2/1963 | Golde | 296/224 |
| 4,342,481 | 8/1982 | Kanou et al. | 296/218 |
| 4,351,560 | 9/1982 | Kanou et al. | 296/218 |
| 4,408,795 | 10/1983 | Saitoh et al. | 296/218 |
| 4,626,026 | 12/1986 | Hasegawa | 296/218 |
| 4,729,596 | 3/1988 | Fujihara et al. | 296/218 |
| 4,750,781 | 6/1988 | Betteridge | 296/218 |
| 4,767,154 | 8/1988 | Okamoto et al. | 296/218 |
| 4,784,431 | 11/1988 | Ohhashi et al. | 296/218 |
| 4,786,092 | 11/1988 | Shiraishi et al. | 296/224 |
| 4,869,549 | 9/1989 | Londeck et al. | 296/224 |
| 4,998,771 | 3/1991 | Schreiter et al. | 296/224 |
| 5,112,100 | 5/1992 | Murkett et al. | 296/218 |
| 5,284,378 | 2/1994 | Sautter et al. | 296/224 |
| 5,601,330 | 2/1997 | Ulbrich et al. | 296/224 |

FOREIGN PATENT DOCUMENTS

| | | | |
|---|---|---|---|
| WO092015466 | 9/1992 | European Pat. Off. | 296/224 |
| 29 29 915 A1 | of 0000 | Germany . | |
| 33 37 933 C2 | of 0000 | Germany . | |
| 802907 | 2/1951 | Germany | 296/218 |

*Primary Examiner*—Joseph D. Pape
*Assistant Examiner*—Kiran Patel
*Attorney, Agent, or Firm*—Evenson & McKeown Edwards & Lenahan, P.L.L.C.

[57] ABSTRACT

A roof arrangement has two roof parts which are divided in the transverse direction of the roof, are plate-shaped, and can be removed individually. Receptacles are provided on the roof frame and therebetween. The receptacles on the roof frame limit the lowering movement of the roof parts, which are initially guided in the receptacles located therebetween. Latching devices located in the transitional area between two roof parts secure the two roof parts while aligning the vertically.

3 Claims, 4 Drawing Sheets

TWO PART ROOF ARRANGEMENT

BACKGROUND OF THE INVENTION

This application claims the priority of German Application No. 197 38 829.9, filed Sep. 5, 1997, the disclosure of which is expressly incorporated by reference herein.

The present invention relates to a roof arrangement consisting of two panel-shaped roof parts which are divided in the transverse direction of the vehicle, individually removable, and replaceable. The roof parts, when mounted, engage at their opposite end areas in a self-centering manner in external recesses on the roof frame and therebetween. Both roof parts are held by latching devices located in their seam area.

A roof arrangement is shown in DE 29 29 915 A1. The seam area two roof parts rest on a cross member connecting both roof frames with one another. The roof parts are supported by the member and with further reinforcement by the roof parts pressing against gaskets on the transverse member side by means of eccentric latches.

SUMMARY OF THE INVENTION

An object of the present invention is to provide a roof arrangement in which the two roof parts are configured cantilevered at their seam area while retaining a good supporting effect. Thereby, a transverse member support is not required, and the entire area spanned by the roof arrangement is completely open after the two roof parts are removed.

This object has been achieved by providing that receptacles that are located in each case between roof mounted receptacles are configured as centrally located plug hinges, in that both fitted roof parts with interposition of a seal (seam) are aligned in the vertical direction by receptacles on the roof frame so that they abut one another, and the vertical alignment of roof parts with respect to one another is fixed by latching devices.

In a presently preferred embodiment of the present invention, each plug hinge is a tongue hinge with a tongue receptacle integral with the body with a uniformly curved guide path, into which an equally curved tongue projecting from the roof engages. The self-centering receptacles on the roof frame side initially only enter the path of the roof parts that pivot around an imaginary pivot axis located above the roof arrangement.

In another embodiment of the present invention, each latching device has a shaft permanently connected with a roof part. The free end of said shaft serves as a bearing point for at least one bearing shell projecting beneath the other roof part. A strap surrounds the shaft end and tensions itself against the bearing shell provided as the latching member. Other latching devices can also be used, in which, in the locking operation of the two roof parts, a flush alignment of their upper surfaces takes place. This can be achieved for example by a locking mechanism that is displaceable along the length of the vehicle.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
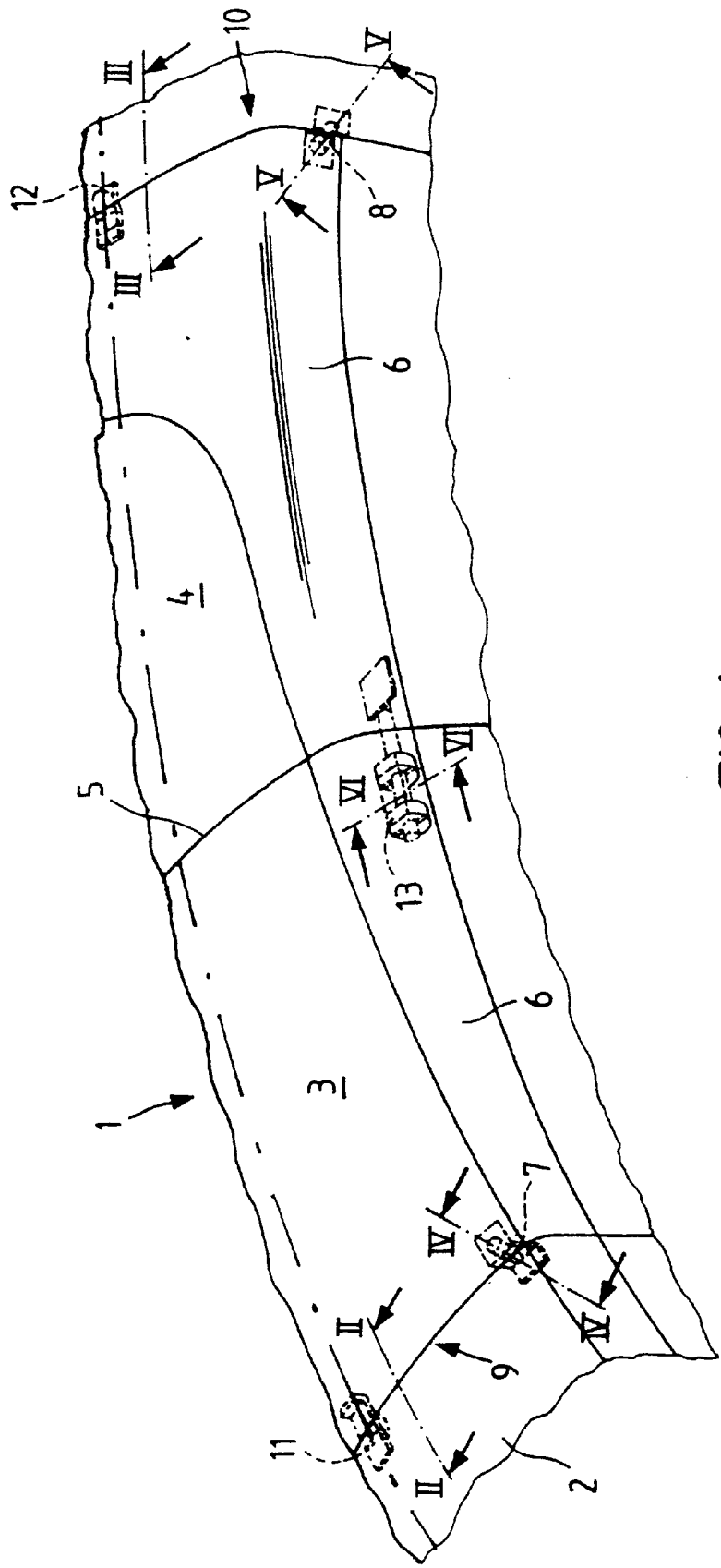
FIG. 1 is a partial perspective view of a roof arrangement showing both roof parts along a central lengthwise axis of the motor vehicle and the adjoining areas indicating the positions of the receptacles and the latching device.

A roof arrangement 1 shown in FIG. 1 consists of a front first roof part 3 associated with windshield 2 and a rear second roof part 4 adjoining roof part 3. As the result of a separating seam 5 that runs in the transverse direction of the vehicle, and is located in a seam area, two approximately equal roof sections are obtained that can be carried in the luggage compartment of a motor vehicle.

External receptacles 7, 8 associated with a roof frame 6 and receptacles 11, 12 located centrally with respect to end areas 9, 10 of roof parts 3, 4 that are remote from one another are provided to secure roof parts 3 and 4. The securing of both roof parts 3 and 4 beneath one another is performed by a latching device 13 on the roof frame in each case.

Figure 2:
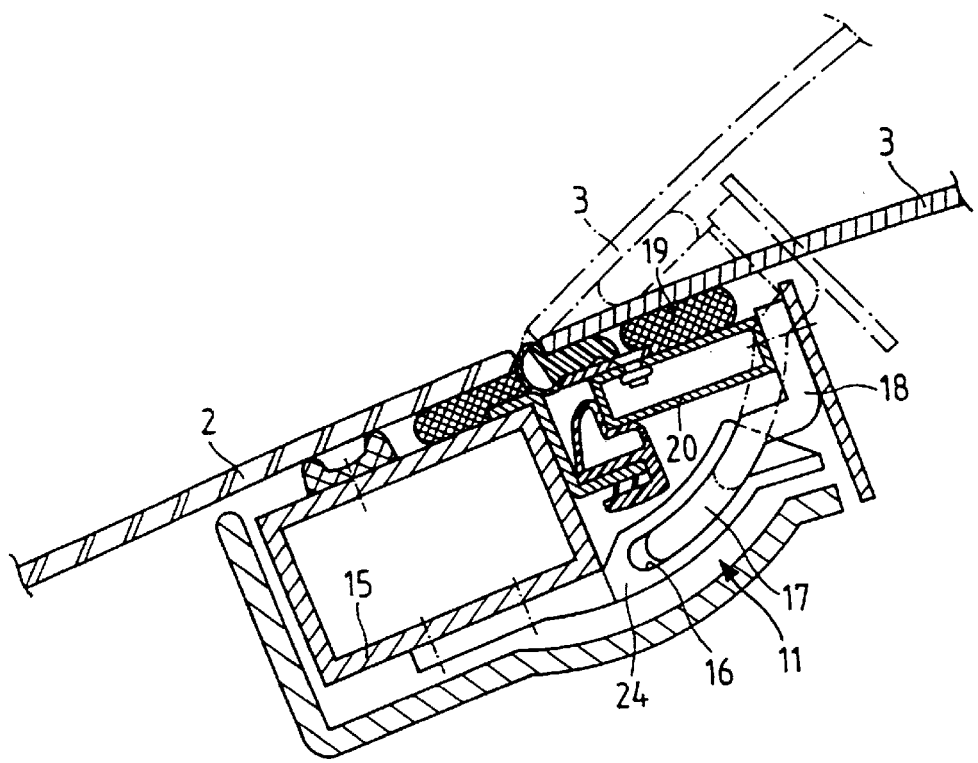
FIGS. 2 to 6 show sections corresponding to the section lines II—II to VI—VI in FIG. 1.

The receptacle 11 shown on an enlarged scale in FIG. 2 is a plug hinge whose fixed tongue receptacle 14 is received by an upper transverse member 15 that supports windshield 2. Tongue receptacle 14 is provided with a uniformly curved guide path 16 into which the equally curved tongue 17 can enter, whose end 18, bent at an angle and remote from the receptacle, is secured to a cross member 20 that receives the glass piece section of roof part 3 by an adhesive bead 19. The entrance of tongue receptacle 14 is configured to be funnel-shaped so that when roof part 3 is inserted (as indicated by the dot-dashed lines), roof part 3 centers itself.

Figure 3:
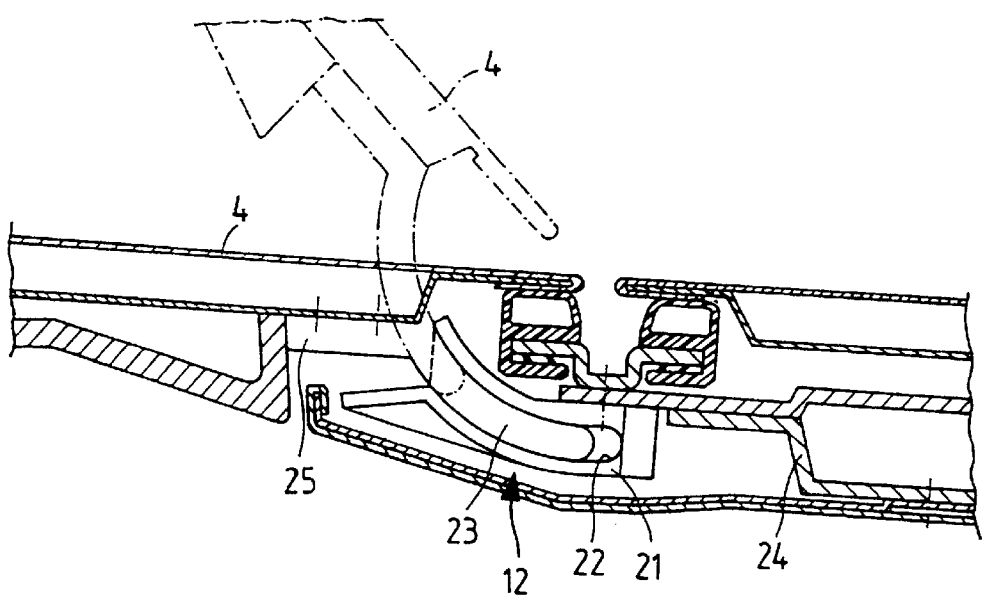

FIG. 3 shows receptacle 12, likewise on an enlarged scale, which like receptacle 11 is a plug hinge. A similarly curved tongue 23 can enter a fixed tongue receptacle 21 with a uniformly curved guide path 22. The tongue receptacle 21 that is made funnel-shaped at the entrance is connected with a fixed roof member 24 that runs in the transverse direction of the vehicle, while end 25 of tongue 23 that runs at an angle is secured underneath roof part 4 which in this portion is made of sheet metal.

Figure 4:
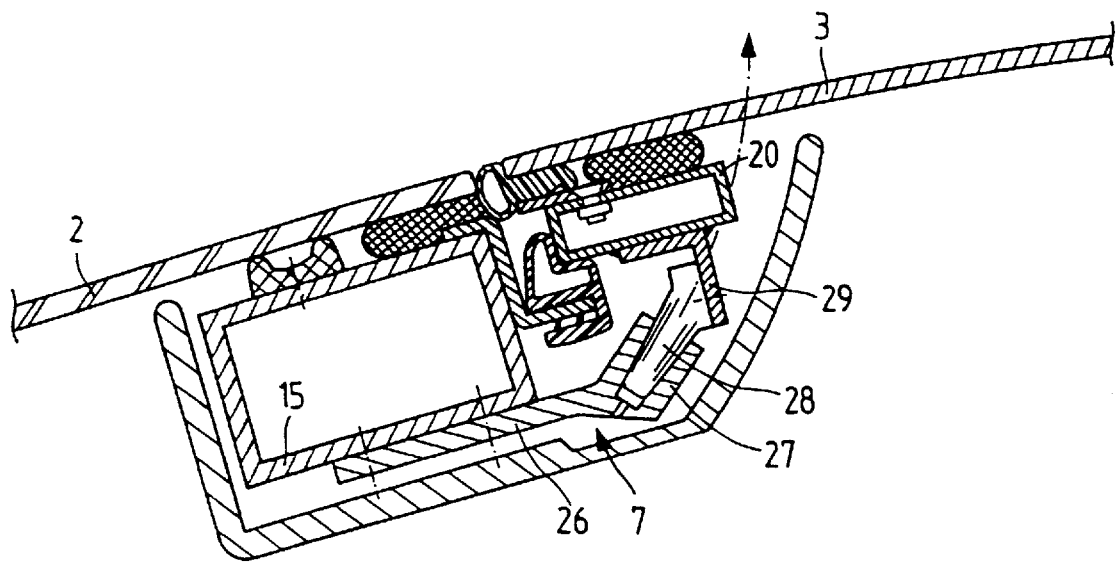

The receptacle 7 shown in FIG. 4, which is associated mirrorwise with respect to the opposite roof frame (not shown for clarity), consists of a holder 26 connected with cross member 15 with an endwise conical sleeve 27 into which a conical pin 28 of part 29 of receptacle 7 fastened to cross member 20 can engage.

Figure 5:
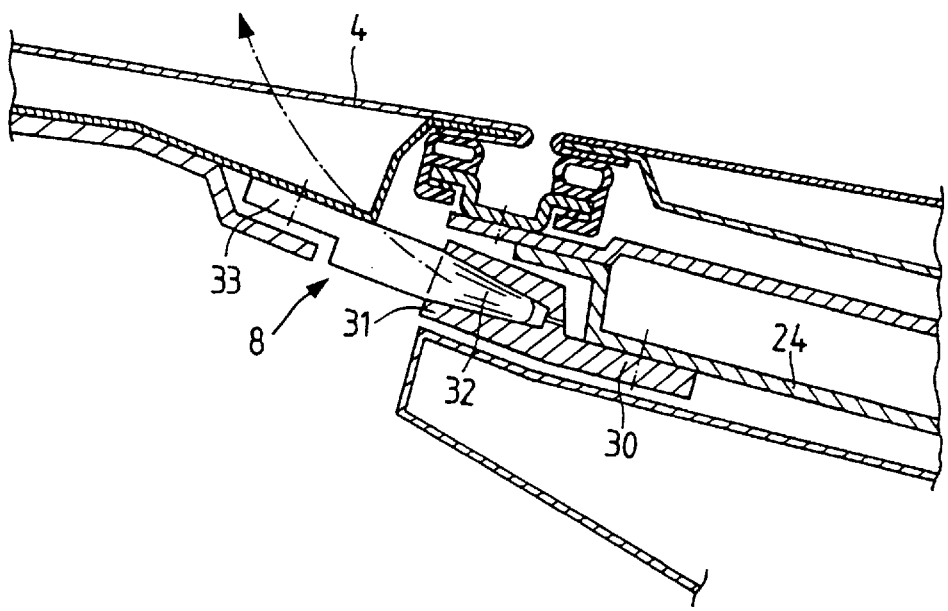

Receptacle 8 in FIG. 5, which is once again arranged mirrorwise with respect to the opposite roof frame (not shown) is equipped with a holder 30 fixed to roof member 24 with a conical sleeve 31 at the entrance, into which a conical pin 32 of section 33 of receptacle 8 that is fastened below roof part 4 can engage.

Receptacles 7, 8, on the one hand, and receptacles 11, 12, on the other hand, are adjusted to one another in terms of size such that it is only after tongues 17, 23 have entered matching tongue receptacles 14, 21 that conical pins 28, 32 can enter matching conical sleeves 27, 31. This ensures that shortly after tongues 17 and 23 have been introduced, associated roof parts 3 or 4 can no longer come loose inadvertently, and then a predetermined lowering movement takes place around an imaginary pivot axis which necessarily leads to the entry of conical pins 28, 32 by which the lowering movement is limited, so that the respective roof parts 3 and 4 are self-supporting.

Figure 6:
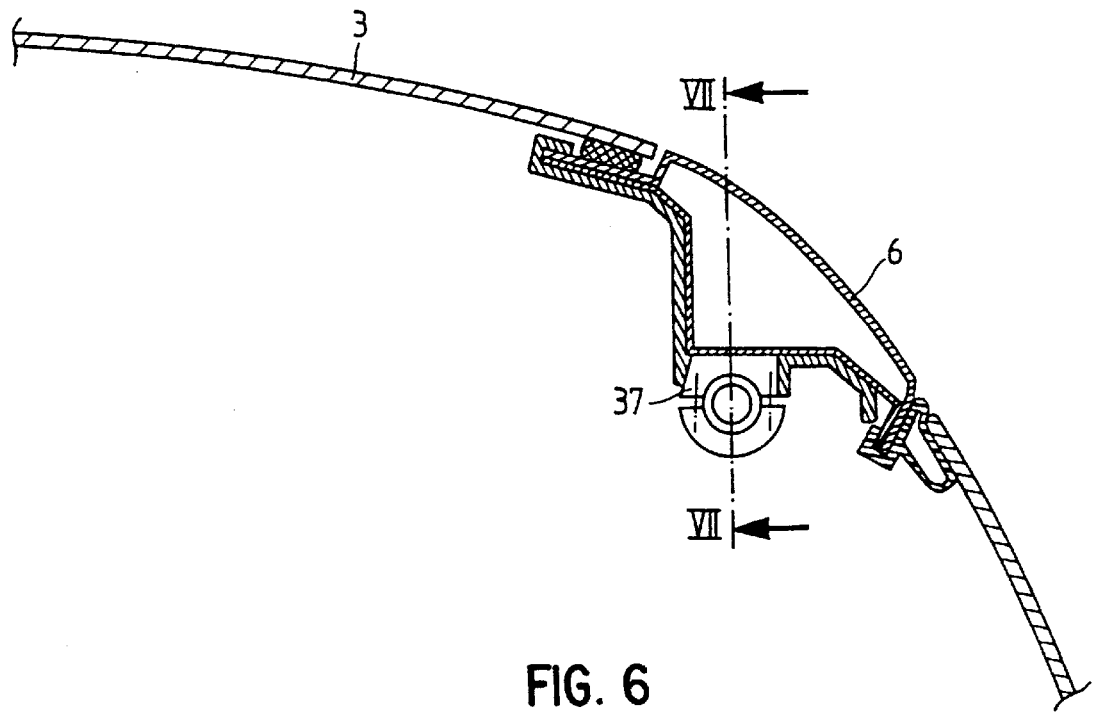
Figure 7:
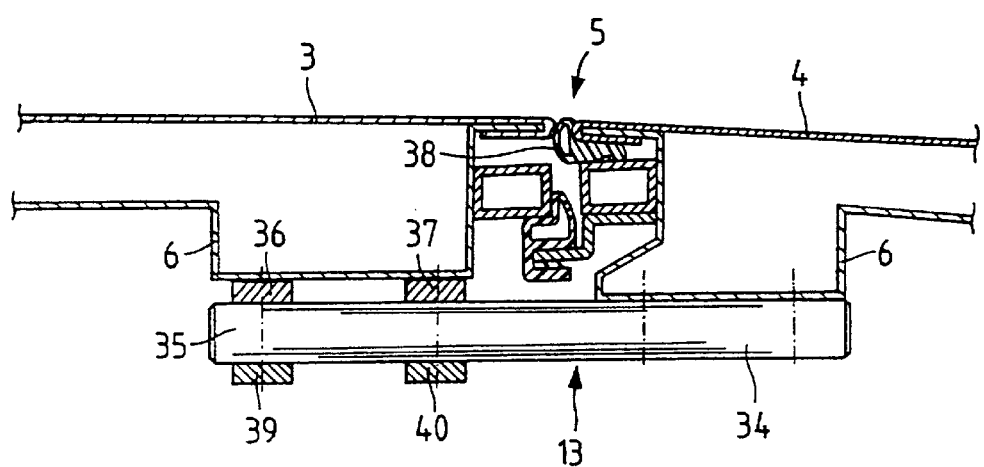
FIG. 7 is a sectional view along lines VII-VII in FIG. 6.

Latching device 13 according to FIGS. 6 and 7 comprises a shaft 34 mounted below roof frame 6 of roof part 4. The shaft extends with its free shaft end 35 toward roof part 3.

Below the roof frame 5 of the roof part 3, bearing shells 36, 37 spaced apart from one another are located which, when roof part 3 is lowered, fit around free shaft end 35 of previously inserted roof part 4. In this way, a flush transition is produced between the two roof parts 3, 4 in the area of separating seam 5 sealed by a seal 38. Nevertheless, any vertical offset as a result of tolerances is eliminated by the subsequent final securing of the lowered position of both roof parts 3, 4. Straps 39, 40 which fit around free shaft end 35 from below are screwed to respective bearing shells 36, 37.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Roof arrangement, comprising two separate plate-shaped roof parts divided along a transverse direction of the vehicle, removable individually, and replaceable, said roof parts self-centeringly engaging, in a mounted condition, at opposite end areas thereof defining a seam area in external receptacles on a roof frame side and being secured between the end areas and the receptacles by latching devices located in the seam area thereof to fix vertical alignment of the roof parts with respect to one another, wherein the receptacles located between roof mounted receptacles are located centrally of the roof parts plug hinges, the roof parts being provided with a seal interposed therebetween and being abuttingly aligned by additional receptacles in a vertical direction.

2. Roof arrangement according to claim 1, wherein each plug hinge is a tongue hinge with a tongue receptacle integral with the associated roof pad, and has a uniformly curved guide path engageable with a correspondingly curved tongue projecting from the roof part, the self-centering receptacles on the roof frame entering only along a path of the roof part which pivots around an imaginary pivot axis located above the roof arrangement.

3. Roof arrangement according to claim 1, wherein each latching device comprises a shaft permanently connected with one roof part, a free end of said shaft being a bearing point for at least one bearing shell projecting underneath the other roof part, and a strap surrounds the free end and tightens against the bearing shell to constitute a latching member.

* * * * *